No. 756,619. PATENTED APR. 5, 1904.
L. B. GAYLOR.
AUTOMOBILE.
APPLICATION FILED JAN. 13, 1904.
NO MODEL.

WITNESSES:
C. H. Bertholf.
F. M. Donstach.

INVENTOR
Leonard B. Gaylor
BY
Phillips Abbott
ATTORNEY

No. 756,619.

Patented April 5, 1904.

UNITED STATES PATENT OFFICE.

LEONARD B. GAYLOR, OF NEWTON CENTER, MASSACHUSETTS.

AUTOMOBILE.

SPECIFICATION forming part of Letters Patent No. 756,619, dated April 5, 1904.

Application filed January 13, 1904. Serial No. 188,834. (No model.)

*To all whom it may concern:*

Be it known that I, LEONARD B. GAYLOR, a citizen of the United States, and a resident in the city of Newton Center, county of Middlesex, State of Massachusetts, have invented a new and useful Improvement in Automobiles, of which the following is a full, clear, and exact description, reference being had to the accompanying drawings, in which—

Figure 1:
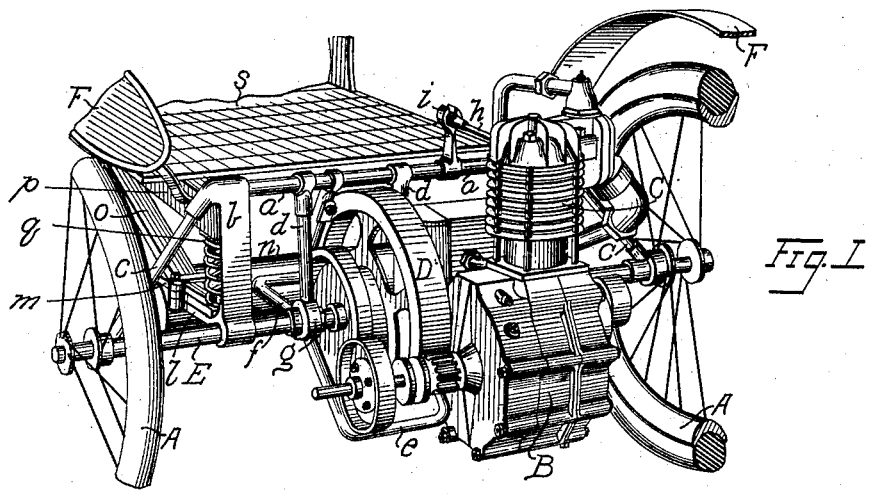
Figure 2:
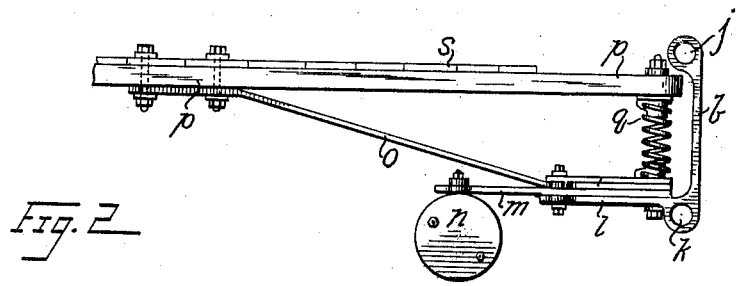
Figure 3:
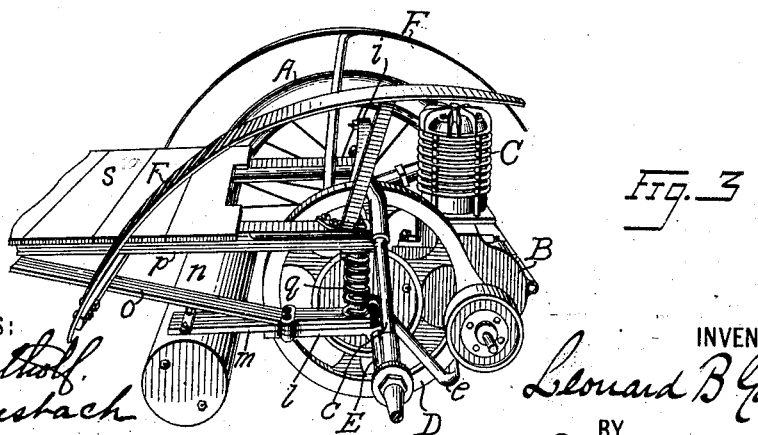

Figure 1 illustrates a perspective view of the rear of an automobile embodying my invention. Fig. 2 illustrates a side elevation of the parts immediately embodying the invention; and Fig. 3 illustrates a side elevation, partly in perspective, of the parts shown in Figs. 1 and 2 combined or assembled with certain of the other parts.

In the drawings hereof I have illustrated my invention as applied to a form of automobile heretofore patented by me and known as the "buckboard automobile." I wish it to be understood, however, that the invention is applicable to automobiles of various forms or constructions wherever parts are present or may be applied which are adapted to receive and beneficially utilize the features involved herein.

In the drawings, A A represent the rear wheels; B, the crank-casing; C, the motor; D, the casing for the large spur-gear which is driven by the small pinion on the motor-shaft; E, a piece of tubing through which the driven axle passes, and F the mud-guards.

I do not specify the other parts of the motor and coacting mechanism, since they form no part of this invention. Indeed, many of the necessary parts of such engine or motor I have not illustrated at all for the sake of simplicity and clearness in the drawings.

The motor and coacting parts are supported upon a frame, which is in turn supported upon the driven axle. This frame embodies a cross-bar $a$, supported in the upper ends of two brackets $b$ $b$, there being one at each side of the vehicle adjacent to the rear wheels, and these brackets are braced laterally by braces $c$. The brackets and the braces are collared or supported on the tube E. The motor-support also comprises a frame composed substantially of vertical bars $d$ $d$, which are connected at their upper ends to the cross-bar $a$, there being also other members or bars $e$ and $f$, which come together near their central ends upon a hub $g$, which is fixed upon the tube E. The engine or motor is also supported at its upper part by a brace-bar $h$, which engages with an arm $i$, rigidly keyed or otherwise connected to the cross-bar $a$. The tube E, through which the driven axle passes, is supported thereon by suitable bearings at each of its ends near the wheels, respectively.

The shape of the brackets $b$ is best seen in Fig. 2. At their upper ends are formed openings $j$, in which the respective ends of the bar $a$ are received, and at their lower ends are openings $k$, through which the tube E passes. Each of these brackets has formed integrally with them a forwardly-extending arm $m$, upon which the muffler $n$ is preferably supported. Spring-bars or leaf-springs $o$ are likewise bolted to the forwardly-projecting arms $l$, one at each side of the machine, and their upper and forward ends are bolted to the side bars $p$ of the vehicle body or platform. These spring-bars $o$ $o$ have sufficient stiffness to act as the thrust or push bars whereby the vehicle is propelled and also as springs to counteract the tendency of the motor to rock backwardly and downwardly when inequalities in the road-bed are encountered. $q$ is a spiral spring, there being one on each side of the machine interposed between the side bars $p$ of the body or platform and the rear end of the spring push-bars $o$. They act as an additional spring or cushioning medium for the platform or body of the vehicle, which rests upon the side bars $p$. The upper and lower convolutions of these spiral springs are suitably attached to the parts against which they rest to retain them in position.

It will be noted that the construction above described is exceedingly simple and exceedingly effective and that the construction and arrangement of the parts is such that peculiar advantages result, because the parts are made to serve not a single function, as in ordinary constructions, but in some instances two and in some three functions, each not interfering with the other, whereby great simplicity in the construction and consequent reduction of cost and unusual efficiency is secured. For example, since the relatively heavy motor is carried in rear of the driven axle and is supported upon a frame carried by that axle, when inequalities are met in the road-bed, particularly if they are at all excessive—as, for instance, a hole therein or an elevated crosswalk or other obstruction—that the jolt resulting therefrom would tend to make the motor tilt violently downwardly and backwardly, and this impulse is counteracted by the springs *o*, partly because of their resiliency, whereby a cushioning action results, and partly because the vehicle-body likewise experiences the effect of the obstruction and transmits the forward thrust through the springs *o* as a result of their compression caused by the obstruction. Thus a depressing action is exerted upon the forwardly-projecting arms *l l*, additionally tending to counteract the backward and downward impulses of the motor; also, the springs *o* fulfil the function of push-bars for the propulsion of the forward part of the vehicle.

The spiral springs *q q*, there being one or more on each side of the vehicle, as above stated, aid in cushioning the body or platform, supplementing the spring push-bars *o* in this respect. They also tend to hold down the forward projecting arms *l l*, and being connected at top and bottom with the parts against which they rest they tend to limit the upward as well as the downward movements of the spring push-bars *o o*.

It will be obvious to those who are familiar with this art that various modifications may be made in the details of construction of the parts described and illustrated. Therefore I wish it understood that herein I describe and illustrate one form only in which the invention may be embodied. Various modifications may be made without departing from the essentials of the invention. For example, the frame which supports the motor and coacting parts may be made in a variety of ways; also, there may be more than two of the spring push-bars *o* and more than two of the spiral springs *q*, and they may be constructed and arranged, so far as the details are concerned, quite differently from those herein shown and described. All that is essential is that substantially the stated relation of the parts shall exist.

Having described my invention, I claim—

1. The combination in an automobile of a motor located in rear of the driven axle and carried by a frame supported on said axle, forwardly-extending arms rigidly connected with said frame and a muffler or similar part of the mechanism supported on said arms in front of the driven axle.

2. The combination in an automobile of a motor located in rear of the driven axle and carried by a frame supported on said axle, forwardly-extending arms rigidly connected with said frame a muffler or similar part of the mechanism supported on said arms and springs engaging at one end with said arms and at their other ends with the body of the vehicle.

3. The combination in an automobile of a motor located in rear of the driven axle and carried by a frame supported on said axle, forwardly-extending arms rigidly connected with said frame and resilient or spring bars connected at one end to said arms and at their other ends to the body of the vehicle.

4. The combination in an automobile of a motor located in rear of the driven axle and carried by a frame supported on said axle, forwardly-extending arms rigidly connected with said frame, resilient or spring bars connected at one end to said arms and at their other ends to the body of the vehicle and spiral springs interposed between said arms and the rear part of the body of the vehicle.

5. The combination in an automobile of a motor located in rear of the driven axle and carried by a frame supported on said axle, forwardly-extending arms rigidly connected with said frame, a muffler or similar part of the mechanism supported on said arms in front of the driven axle, resilient or spring bars connected at one end to said arms and at their other ends to the body of the vehicle, and spiral springs interposed between said arms and the rear of the body of the vehicle.

6. The combination in an automobile of a motor located in rear of the driven axle and carried by a frame supported on said axle, said frame being partly supported by two brackets, one at each end, said brackets embodying a horizontal member and a vertical member, and elastic bars or springs connected at one end with said horizontal members and at their other ends with the body of the vehicle.

7. The combination in an automobile of a motor located in rear of the driven axle and carried by a frame supported on said axle, said frame being partly supported by two brackets, one at each end, said brackets embodying a horizontal member and a vertical member, elastic bars or springs connected at one end with said horizontal members and at their other ends with the body of the vehicle, and other springs interposed between the body of the vehicle and said horizontal members.

8. The combination in an automobile of a motor and coacting parts entirely disconnected from the body of the vehicle, a driven axle connected with said body by elastic push bars or rods, whereby the vehicle is propelled and cushioned, and additional springs interposed between the driven axle and the body of the vehicle.

9. The combination in an automobile of a motor and coacting parts entirely disconnected from the body of the vehicle, a driven axle connected with said body by elastic push bars or rods, whereby the vehicle is propelled and cushioned, and spiral springs interposed between the body of the vehicle and the driven axle.

In testimony whereof I have signed my name to this specification in the presence of two subscribing witnesses.

LEONARD B. GAYLOR.

Witnesses:
CHARLES H. WOLF,
PETER F. MINNOCK.